United States Patent [19]

Burke

[11] 4,295,765
[45] Oct. 20, 1981

[54] TIE-DOWN STRUCTURE

[76] Inventor: Michael R. Burke, 1017 Poplar Ct., Mt. Carmel, Ill. 62863

[21] Appl. No.: 32,551

[22] Filed: Apr. 23, 1979

[51] Int. Cl.$^3$ ...................... A62B 35/00; B61D 45/00
[52] U.S. Cl. .................... 410/101; 296/167; 410/110; 411/366; 411/395; 411/400
[58] Field of Search ............ 410/112, 49, 50, 101–116; 296/167; 151/41.73; 85/32 R

[56] References Cited

U.S. PATENT DOCUMENTS 2,051,066  8/1936  Anderson .......................... 85/32 R
3,276,499  10/1966  Reusser ............................ 151/41.73
3,421,726  1/1969  Getter ................................ 410/110

Primary Examiner—Richard A. Bertsch
Attorney, Agent, or Firm—Warren D. Flackbert

[57] ABSTRACT

A structure serving for use in the tie-down of cargo on the bed of a truck characterized by a body member, partly threaded both externally and internally, which has been inserted into a hole drilled through the truck bed, and a further assembly including both a positioning or plug member and a nut disposed beneath the truck bed and threadedly secured to external threads on the stem of the body member. The head of the body member and the positioning member each have complementary outwardly flaring surfaces, so that, when drawn together by wrench means, the top surface of the body member is in a generally flush relationship with the surface of the truck bed adjacent the hole. The internal threads of the body member typically receive an eyehook, which, in turn, receives a rope or the like for positioning the cargo on the bed of the truck.

6 Claims, 7 Drawing Figures

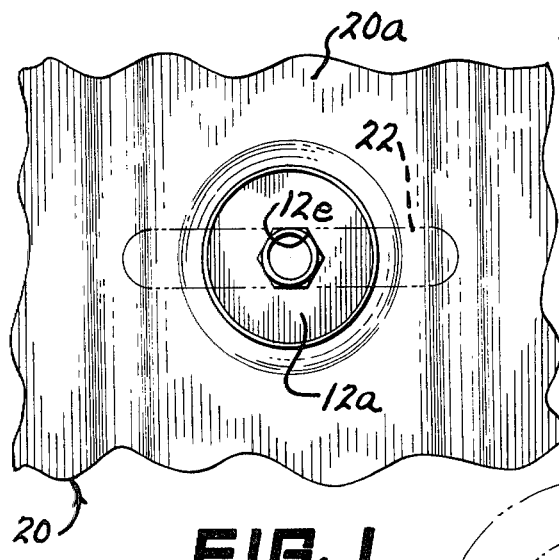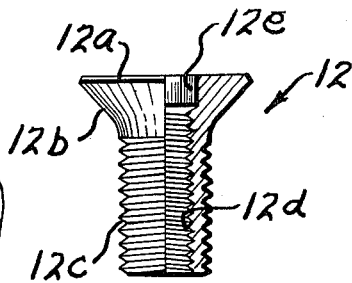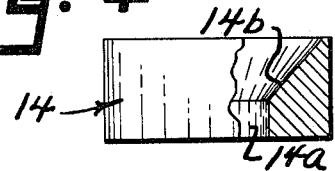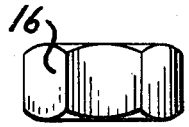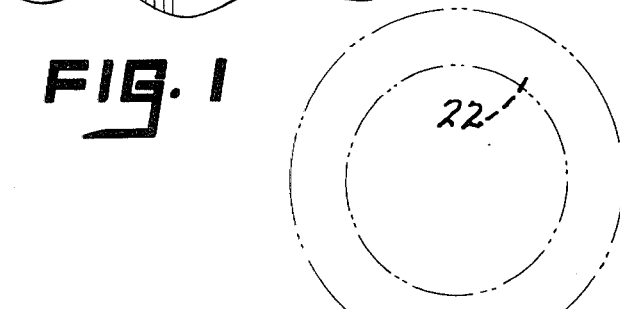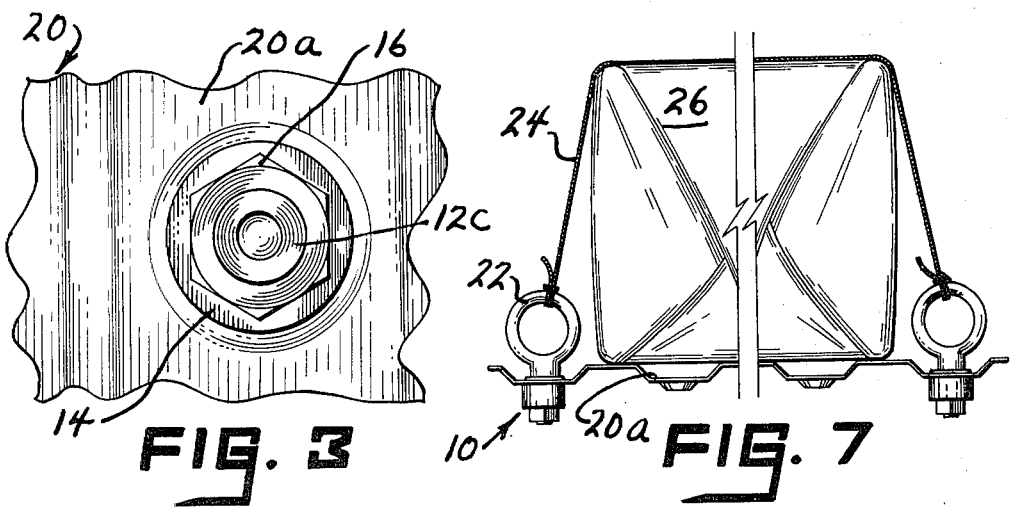

TIE-DOWN STRUCTURE

As is known, a problem exists in unwanted movement of cargo on the bed of a truck, such as a pickup truck, during transport. One prior approach has been the use of ropes or other cables to accomplish the positioning purposes, although such is oftentimes a time consuming procedure because of the lack of proper locations to effectively secure or tie the ends of the ropes. As a result, an unwieldy amount of rope or cable may sometimes be required to stabilize the cargo for shipment.

The invention satisfies the aforesaid need by presenting a readily positionable tie-down structure having effective usage for cargo steadying purposes. In this connection, a three-part assembly is provided, i.e. a partly externally and internally threaded body member adapted to extend through a hole or opening drilled, for example, through the bed of a truck or any other desired surface, and at locations in a preselected pattern; a positioning or plug member surrounding the stem of the body member; and, a nut disposed adjacent the positioning member on the threaded stem of the body member, where both the plug member and the nut are disposed beneath the bed of the truck or, restated, on an opposite side of the surface which receives the body member.

In any event, the head of the body member has an outwardly flaring undersurface, the latter being complementary shape-wise to the upper inner surface of the plug member. A cut-out portion on the top of the body member, above the internally threaded portion, receives a hex wrench for tightening or loosening purposes.

When tightening is achieved, the plug member and the head of the body member come together, causing the deformation of the truck bed area around the hole. Thus, the tie-down structure of the invention is flush mounted, i.e. the top surface of the body member is relatively in the same plane as the surface of the truck bed. Thereafter, another component, such as an eyebolt, may be readily secured to the internal threads of the body member.

In other words, once each assembly has been initially positioned at the desired locations on the truck bed, simple usage of the hex wrench serves to tighten the structure at such locations, i.e. deforms the bed or mounting surface to accomplish an overall flush relationship therewith. The preceding precludes the possibility of raised portions which might interfere with the cargo being transported.

A better understanding of the present invention will become more apparent from the following description, taken in conjunction with the accompanying drawing, wherein FIG. 1 is a top plan view showing the tie-down structure of the invention in position on a truck bed or other supporting surface, where an associated eyebolt is shown in phantom;

FIG. 2 is a view in vertical section of the invention, taken through the mid-plane thereof on FIG. 1;

FIG. 3 is a bottom plan view of the invention, looking towards the opposite surface of the truck bed or like supporting surface;

FIG. 4 is an enlarged detailed view of the body member forming a part of the tie-down structure;

FIG. 5 is a detailed view in elevation, partly in vertical section, showing the plug or positioning member forming part of the invention;

FIG. 6 is a view in side elevation of the nut which is mounted on the stem of the body member of the assembly; and, FIG. 7 is a view of the invention, after installation, showing such in combination with a positioning rope or cable secured to associated eyebolts.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, and first to the details of FIGS. 4, 5 and 6, the fastening device or tie-down structure 10 of the invention is defined by three parts, viz. a body member 12, a plug or positioning member 14 and threaded means 16, as a nut. The aforesaid components are assembled as presented in FIG. 2.

In any event, the body member 12 (FIG. 4) is defined by a top wall 12a, an outwardly flaring side wall 12b, and an externally threaded stem 12c. An axial internally threaded portion 12d extends partly within the body member 12, where a cavity 12e is provided proximate the top wall 12a for receiving, for example, a hex wrench (not shown) for tightening and loosening purposes.

The plug or positioning member 14 (FIG. 5) is in the shape of a right circular cylinder, with an unthreaded axial passageway 14a opening into an outwardly flaring inner wall 14b complementary in shape to the outwardly flaring side wall 12b of the body member 12. More specifically, the shape of the inner wall 14b may be described as frustoconical. As apparent, the plug member 14 is free to move along the threaded stem 12c of the body member 12.

The threaded means 16 (FIG. 6) is typically a conventional nut (also see FIG. 2) and requires no special discussion at this time.

FIG. 2, supported by FIGS. 1 and 3, and together with FIG. 7, show the assembly and use or installation of the invention. In this connection, the tie-down structure 10 has particular adaptability for fastening cargo onto a metal truck bed 20 or other metal supporting surface. As known, a truck bed 20 typically includes a series of recessed channelways 20a (see FIG. 7) into which the invention is preferably secured.

In any event, a hole or opening is first drilled through the supporting surface or truck bed 20 and the stem 12c of the body member 12 inserted therein, the component resting, at first, on side wall 12b. The plug member 14 and the nut 16 are then assembled onto the threaded stem 12c on the opposite side of the supporting surface 20 until further preliminary tightening can not be achieved.

Thereafter, the hex wrench is inserted into the cavity 12e in the body member 12 and rotated. The latter movement causes a deformation of the metal surrounding the hole and the ultimate flush mounting of the top wall 12a of the body member 12 substantially in the plane of the adjacent metal surface (see FIG. 2).

In other words, the assembled tie-down structure 10 is securely positioned for the desired fastening results. In order to accomplish the latter, and by way of example, an eyebolt 22 (FIG. 7 and shown in phantom in FIG. 2) is employed together with a rope or cable 24, where the latter overlies cargo 26. It might be noted that the holes or openings for receiving the invention might be predrilled for subsequent use and in various patterns to accommodate different end purposes.

The tie-down structure described hereabove is susceptible to various changes within the spirit of the invention, including, by way of example, dimensioning, proportioning, the type of rotation means employed, and the like. Moreover, an attachment version is available, i.e. the use of a heavy duty base plate secured to supporting framework, where such plate includes a preformed recessed flared portion around the opening which represents the deformed metal of the supporting surface 20 evident in FIG. 2. Thus, the preceding should be considered illustrative and not as limiting the scope of the following claims:

I claim:

1. A tie-down structure comprising a body member having a head with a top wall and an outwardly flaring side wall and a threaded stem, said threaded stem adapted to extend through an opening formed in a supporting surface, and a plug member and threaded means disposed on said threaded stem on a side of said supporting surface opposite to that of said head, said plug member freely movable on said threaded stem of said body member and having an outwardly flaring inner wall complementary in shape to said outwardly flaring side wall of said head and said threaded means in a stopping relationship therewith, where said top wall of said head is substantially flush with a deformed portion of said opening in said supporting surface at an installed position.

2. The tie-down structure of claim 1 where said outwardly flaring inner wall of said plug member has an inverted frustoconical shape.

3. The tie-down structure of claim 1 where said outwardly flared inner wall of said plug member is selectively urged into a cooperating supporting surface deforming relationship with said outwardly flaring side wall of said head.

4. The tie-down structure of claim 3 where means rotating said body member achieve said installed position.

5. The tie-down structure of claim 1 where said body member has an internally threaded portion for receiving and positioning auxiliary fastening means.

6. The tie-down structure of claim 1 where said supporting surface is the bed of a truck.

* * * * *